United States Patent
Zhao et al.

(10) Patent No.: US 9,330,086 B2
(45) Date of Patent: May 3, 2016

(54) METHOD AND APPARATUS FOR IDENTIFYING A LANGUAGE USED IN A DOCUMENT AND PERFORMING OCR RECOGNITION BASED ON THE LANGUAGE IDENTIFIED

(71) Applicant: MOTOROLA SOLUTIONS, INC., Schaumburg, IL (US)

(72) Inventors: Ming-Xi Zhao, Shanghai (CN); Shi-Jie Chen, Shanghai (CN); Qi-Zhen He, Shanghai (CN); Wei Lin, Lake Zurich, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 0 days.

(21) Appl. No.: 14/427,668

(22) PCT Filed: Oct. 10, 2012

(86) PCT No.: PCT/CN2012/082727
§ 371 (c)(1),
(2) Date: Mar. 12, 2015

(87) PCT Pub. No.: WO2014/056165
PCT Pub. Date: Apr. 17, 2014

(65) Prior Publication Data
US 2015/0242388 A1    Aug. 27, 2015

(51) Int. Cl.
*G06F 17/27* (2006.01)
*G06K 9/34* (2006.01)
*G06K 9/68* (2006.01)

(52) U.S. Cl.
CPC .............. *G06F 17/275* (2013.01); *G06K 9/342* (2013.01); *G06K 9/6842* (2013.01); *G06K 2209/01* (2013.01); *G06K 2209/011* (2013.01)

(58) Field of Classification Search
USPC ................................ 704/1–10; 382/185–189
See application file for complete search history.

(56) References Cited

U.S. PATENT DOCUMENTS

| | | | |
|---|---|---|---|
| 3,588,822 A | | 6/1971 | Yamamoto |
| 5,313,527 A | * | 5/1994 | Guberman ......... G06K 9/00859 382/186 |
| 6,014,460 A | * | 1/2000 | Fukushima .............. G06K 9/72 382/177 |
| 6,035,063 A | | 3/2000 | Nakashima |
| 6,047,251 A | | 4/2000 | Pon et al. |
| 6,665,437 B1 | | 12/2003 | Chi |
| 7,756,337 B2 | | 7/2010 | Chen et al. |
| 8,009,915 B2 | | 8/2011 | Predovic |
| 2002/0186883 A1 | | 12/2002 | Roman |
| 2004/0006467 A1 | | 1/2004 | Anisimovich et al. |
| 2005/0152601 A1 | * | 7/2005 | Chen .................... G06K 9/6807 382/187 |

(Continued)

OTHER PUBLICATIONS

Changizi et al.; Character complexity and redundancy in writing systems over human history; Proceedings of the Royal Society B, pp. 267-275; Published online Feb. 4, 2005.*

(Continued)

*Primary Examiner* — Abul Azad
(74) *Attorney, Agent, or Firm* — Daniel R. Bestor

(57) ABSTRACT

A method and apparatus for identifying a language used in a document based on a number of strokes per character is provided herein. Once identified, character recognition may take place based on the language identified. In one embodiment, a character recognition engine is utilized for character recognition, wherein the character recognition engine is specifically tailored to the identified language.

9 Claims, 3 Drawing Sheets

(56) References Cited

U.S. PATENT DOCUMENTS

| | | |
|---|---|---|
| 2006/0025988 A1 | 2/2006 | Xu |
| 2006/0055669 A1 | 3/2006 | Das |
| 2008/0097745 A1 | 4/2008 | Bagnato |
| 2008/0111713 A1 | 5/2008 | Zhu |
| 2008/0215307 A1 | 9/2008 | Li et al. |
| 2010/0125447 A1 | 5/2010 | Goswami |

OTHER PUBLICATIONS

PCT International Search Report Dated Jul. 18, 2013 for Counterpart Application PCT/CN2012/082727.

* cited by examiner

METHOD AND APPARATUS FOR IDENTIFYING A LANGUAGE USED IN A DOCUMENT AND PERFORMING OCR RECOGNITION BASED ON THE LANGUAGE IDENTIFIED

FIELD OF THE INVENTION

The present invention generally relates to determining what language is being utilized in a document, and more particularly to a method and apparatus for identifying a language used in a document and performing character recognition based on the identified language.

BACKGROUND OF THE INVENTION

In most character recognition applications, each written character is analyzed and an attempt to identify the character is made. As anyone who has used character recognition knows, this process can take quite some time. For example, performing character recognition on a 15-page document may take up to a minute in commonly-used character recognition software. It would be beneficial if this time period could be reduced. Therefore, a need exists for a method and apparatus for performing character recognition that is faster than prior-art techniques.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Figure 1:
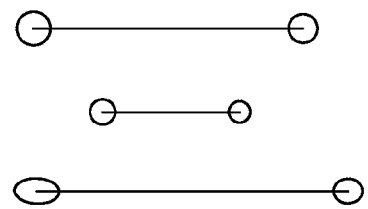
FIG. 1 illustrates a character where each stroke in the character is separated.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to alleviate the above-mentioned need a method and apparatus for identifying a language used in a document is provided herein. Once identified, character recognition may take place based on the language identified. In one embodiment, a character recognition engine is utilized for character recognition, wherein the character recognition engine is specifically tailored to the identified language.

More specifically when a document may be written in one of many languages, a primary language of a printed document (or character) may be identified and the corresponding recognition engine may be used in character recognition. As discussed, the character recognition engine is specifically tailored to the identified language. In this approach, different recognition engines are used separately depending upon the identified language. In order to identify the language being utilized for a character or document, a number of strokes used in writing the character is determined. The number of strokes then determines what recognition engine is utilized when performing character recognition.

The difference in the number of average strokes per character is very large between different languages. As an example, for Chinese, the average number of the strokes per character is about 15. For English, the average the number of strokes per character is about 2. In one embodiment of the present invention, the number of strokes used in a character is determined, and this information is used to determine a primary language used in a document. Once the language has been identified, a specifically-tailored recognition engine may be utilized to identify the characters within the document.

The above technique for identifying language and performing character recognition can greatly reduce an amount of time necessary for character recognition. More specifically, because the number of strokes in a character can be quickly identified, a language used in a document may be quickly identified. This allows specific recognition engines (tailored to the identified language) to be used in identifying a particular character. For example, a first recognition engine may only be capable of identifying characters from a first language (e.g., English), while a second recognition engine may only be capable of recognizing characters from a second language (e.g., Chinese). Since only a single recognition engine is being utilized having a smaller set of characters, the process of character recognition can be sped up considerably. In other words, because a larger recognition engine containing both English and Chinese characters is not used, the process of character recognition can be sped up.

Estimating the Number of Strokes in a Character:

A stroke is defined as a curve/line that begins from the pen-down (terminal point) and ends at the pen-up (also a terminal point). One character includes several strokes. A stroke can cross other strokes. All characters can be classified into two categories:

A. Characters where each stroke in the character is separated (FIG. 1). In this case, it is easy to get the number of strokes in a character. Specifically, the number of terminal points in one character can easily be calculated. In FIG. 1, the number of terminal points is 2 times of that of stroke. So if we know the number of terminal points, we can get the number of stroke in one character.

Figure 2:
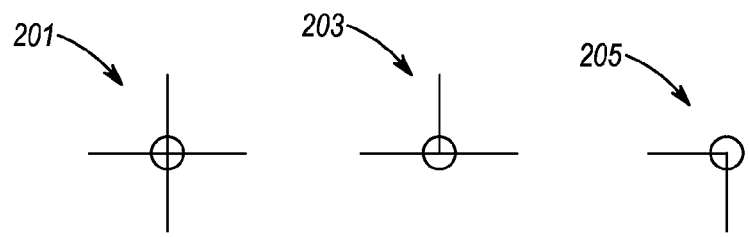
FIG. 2 illustrates a character having strokes intersecting each other.

B. Characters having strokes intersecting each other. Most Chinese characters comprise strokes that intersect each other (FIG. 2). When this is the case, it is more difficult to get the number of terminal points in one Character. We observe that there always are cross points for intersected strokes, which are located in the center or the end of one stroke. We can classify the cross points into three sceneries. For each scenario, we give a rule to get the valid number of terminal points:

For the scenario depicted in 201, there are four branches around the cross point. At the point of intersection, it is assumed that there is no terminal point.

For the scenario depicted in 203, there are three branches at a cross point. At the point of intersection, it is assumed that there exists one terminal point.

For the scenario depicted in 205, where two lines meet, it is defined as a cross point if the angle between the preceding and the next pixel is larger than a threshold (e.g., 60 degrees). At the point of intersection, it is assumed that there exists two terminal points.

Figure 3:
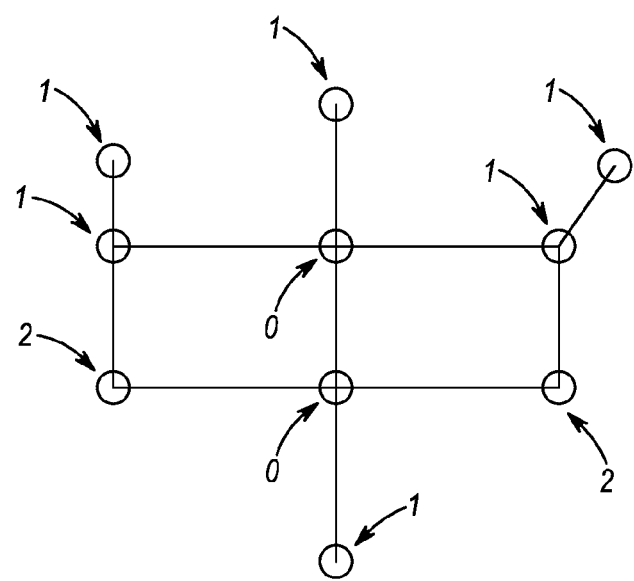
FIG. 3 illustrates the determination of strokes for a particular character.

In order to estimate the total number of stroke in a character, we check all of the terminal points and cross points for the character. The terminal point is a pixel that only has one neighbor and the cross point is in above three cases. Each actual terminal point it contributes one to the total number of terminal points, and for the cross points we can accumulate the number based on the above three cases illustrated in FIG. 2. For example, in FIG. 3, the total number of terminal points is 10 (circled and numbered with the number of calculated strokes), so the number of strokes is 5. (Note that our calculated number of terminal points is 2 times of the actual number of the strokes).

After getting the number of strokes in a character, this value may be utilized to determine the language of the character. For example, if the number of strokes is above a first threshold the language may be identified as a first language (e.g., Chinese, Japanese, Korean, . . . , etc.). However, if the number of strokes is below the first threshold, the language may be identified as a second language (e.g., English, Spanish, . . . , etc.). The threshold, may for example, be 4. So, if determining between English and Chinese (for most cases, there are no English characters where the number of stroke is greater than 4), we assume the character (and in some cases the whole document) is written in Chinese if the number of strokes is greater than 4, otherwise the character is English.

The above technique may be utilized to determine whether or not a document is written in Chinese or English based on an average number of strokes per character from any number of sampled characters. For example, fifteen characters may be sampled and an average number of strokes per character may be obtained. This may be used to decide if the document is written in a first language or a second language. Once the language is identified, character recognition may take place. More particularly, a character recognition engine is utilized for character recognition, wherein the character recognition engine is specifically tailored to the identified language. Specifically tailoring a character engine to a particular language provides the character engine with a character set that includes only characters from the particular language. Thus, a first character recognition engine may be utilized for a first identified language, while a second character recognition engine may be utilized for a second language. The first character recognition engine will not be able to recognize characters from the second language, while the second character recognition engine will not be able to recognize characters from the first language.

Figure 4:
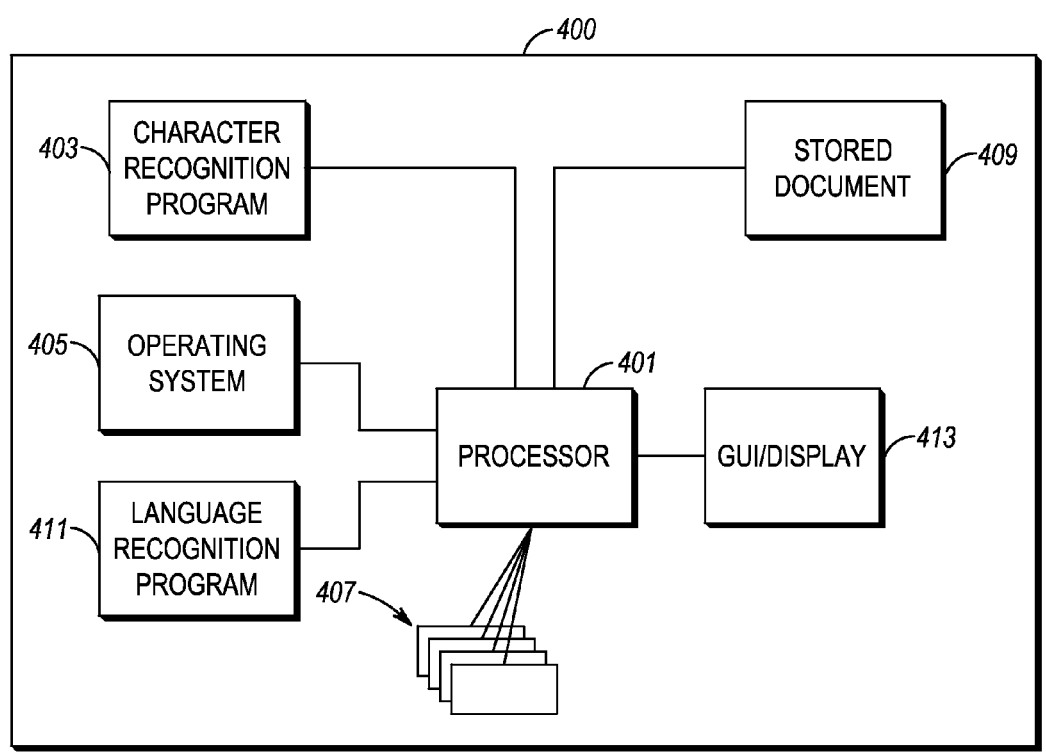
FIG. 4 is a block diagram illustrating an optical character recognition (OCR) device.

FIG. 4 is a block diagram illustrating an optical character recognition (OCR) device 400 according to one embodiment of the present invention. In general, as used herein, the OCR device 400 being "configured" or "adapted" means that the device 400 is implemented using one or more components (such as memory components, network interfaces, and central processing units) that are operatively coupled, and which, when programmed, form the means for these system elements to implement their desired functionality, for example, as illustrated by reference to the methods shown in FIG. 5. OCR device 400 comprises a processor 401 that is communicatively coupled with various system components, including storage storing character recognition engines 407, a storage component storing a character recognition program 403, a storage component storing operating system 405, a storage component storing language recognition program 411, a storage component storing a document 409, and a graphical user interface (GUI) 413. It should be noted that while all storage components are shown existing separately in FIG. 4, one of ordinary skill in the art will recognize that any number of storage components 403-413 may be combined. Additionally, only a limited number of system elements are shown in FIG. 4 for ease of illustration; but additional such elements may be included in OCR device 400.

In one embodiment of the present invention all storage components comprise standard random access memory while processor 401 comprises a digital signal processor (DSP), general purpose microprocessor, a programmable logic device, or application specific integrated circuit (ASIC) and is utilized to use language recognition program 411 to determine a language utilized for any stored document 409 or any language utilized as input to GUI 413. Once a language has been determined by processor 401, processor 401 utilizes character recognition program 403 and an appropriate character recognition engine 407 to perform OCR. It should be noted that while character recognition program 403, language recognition program 411, and engines 407 are shown existing as separate entities, one of ordinary skill in the art will recognize that any number of these elements may be stored within a single memory component.

Figure 5:
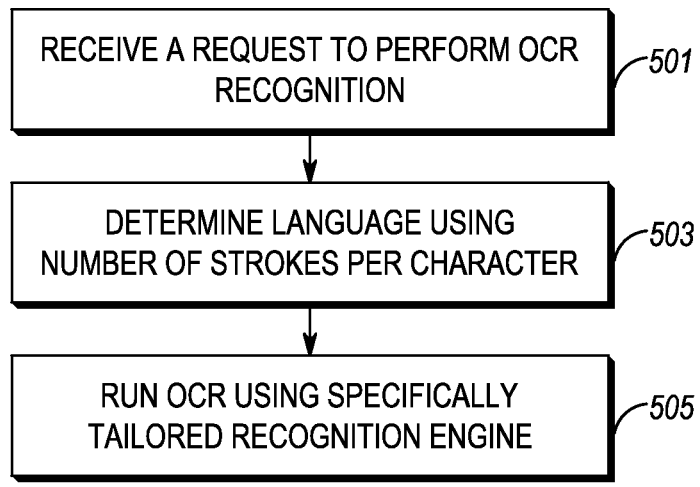
FIG. 5 is a flow chart showing operation of the OCR device of FIG. 4.

The processing device 401 may be partially implemented in hardware and, thereby, programmed with software or firmware logic or code (e.g., the character recognition program 403) for performing functionality described in FIG. 4 and FIG. 5; and/or the processing device 401 may be completely implemented in hardware, for example, as a state machine or ASIC (application specific integrated circuit).

Programs 403 and 411, along with engines 407 run on top of operating system 405 (e.g., Windows 7 or Linux). When any program or engine is requested by the operating system 405 to be launched, it is executed therein by the processor 401. The processing device 401 uses the language recognition program 411 to analyze a document or GUI input and determine a language utilized based on a stroke count. Processor then uses character recognition program 403 and the determined language to load an appropriate engine 407. Character recognition can then be performed using the appropriate engine.

The optical character recognition engine is preferably dedicated software that is specifically tailored to recognize characters of a particular language. In, for example documents using Chinese characters, engines which are designed to identify Chinese characters take preference, while for example, in documents using the English language, engines designed to identify English characters take preference.

Figure 6:
FIG. 6 illustrates thinning of lines to help identify characters.

During operation of device 400, processor 401 receives a request to perform OCR on stored document 409, or on text input through GUI 413. This request may come from the user of device 400 through GUI 413. Once the request is received, a language for the document/input needs to be determined. Processor 401 executes language recognition program 411 in order to determine the language used for the document. During the execution of language recognition program 411, processor 401 will extract each line of text and convert the line of text to black and white using standard binarization. An image processing method will be performed on the black and white image to 'thin' the characters. This is illustrated in FIG. 6. As shown, thicker characters 601 are thinned, resulting in characters 603. In this thinning, the width of the stroke is minimized. In order to identify individual characters, a vertical projection method can be used on the thinned image. After identifying individual characters, an estimate of the number of strokes per character is identified, and an average is obtained. A language is identified based on the average number of strokes per character.

Once the language has been identified, processor 401 executes OCR program 403. When executed, OCR program 403 will utilize the identified language to load a specifically tailored recognition engine 407. OCR will then take place using the specifically tailored recognition engine 407.

FIG. 5 is a flow chart showing operation of device 400. The logic flow begins at step 501 where processor 401 receives a request to perform OCR on stored document 409, or on text input through GUI 413. This request may come from the user of device 400 through GUI 413. Once the request is received processor 401 receives the text, and a language for the document/text is determined by processor 401 (step 503). As discussed above, the language for the document/text is determined by determining an average number of strokes per character for a portion of the document/text (e.g., a predetermined number of characters, a line, a row, . . . , etc.). Once the language has been identified, processor 401 performs OCR (step 505) using a specifically tailored recognition engine 407. As discussed above, in performing OCR, a recognition engine is used to perform character recognition on the text, wherein the recognition engine is specifically tailored to the identified language. Thus, the step of selecting the recognition engine comprises the step of selecting the recognition engine from a plurality of differing recognition engines, wherein each recognition engine within the plurality of recognition engines is specifically tailored to a particular language (e.g., Chinese or English).

In the foregoing specification, specific embodiments have been described. However, one of ordinary skill in the art appreciates that various modifications and changes can be made without departing from the scope of the invention as set forth in the claims below. For example, while a particular technique was given above to determine a number of strokes per character, this should not be considered the only technique that can be used to determine a number of strokes per character. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims.

In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   receiving, at an optical character recognition (OCR) device, text;
   determining, by an electronic processor of the OCR device, an average number of strokes per character for the text;
   identifying, by the electronic processor of the OCR device, a language used for the text based on the determined average number of strokes per character.

2. The method of claim 1, further comprising:
   selecting a recognition engine to perform character recognition on the text, wherein the recognition engine is specifically tailored to the identified language; and
   performing character recognition on the text using the selected recognition engine.

3. The method of claim 2, wherein the selected recognition engine comprises only characters from the identified language.

4. The method of claim 2, wherein the step of selecting the recognition engine comprises a step of selecting the recognition engine from a plurality of differing recognition engines, wherein each recognition engine within the plurality of recognition engines is specifically tailored to a particular language.

5. The method of claim 1, wherein the identified language is Chinese or English.

6. An apparatus comprising:
   a processor; and
   a memory storing instructions that, when executed by the processor, cause the apparatus to perform a set of functions comprising:
   receiving text; and
   determining an average number of strokes per character for the text; and
   identifying a language used for the text based on the determined average number of strokes per character.

7. The apparatus of claim 6, further comprising:
   a plurality of recognition engines stored in the memory, wherein the processor selects a single recognition engine from the plurality of recognition engines to perform character recognition on the text, wherein the selected recognition engine is specifically tailored to the identified language.

8. The apparatus of claim 7, wherein the selected recognition engine comprises only characters from the identified language.

9. The apparatus of claim 7, wherein the identified language is Chinese or English.

* * * * *